United States Patent
McCann et al.

(10) Patent No.: US 12,238,643 B2
(45) Date of Patent: *Feb. 25, 2025

(54) NETWORK ADDRESS POLICY INFORMATION RECEIVED IN A PRE-ASSOCIATED STATE

(71) Applicant: Malikie Innovations Limited, Dublin (IE)

(72) Inventors: Stephen McCann, Southampton (GB); Michael Peter Montemurro, Toronto (CA); James Randolph Winter Lepp, Ottawa (CA)

(73) Assignee: Malikie Innovations Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/584,086

(22) Filed: Feb. 22, 2024

(65) Prior Publication Data
US 2024/0276355 A1    Aug. 15, 2024

Related U.S. Application Data

(63) Continuation of application No. 17/808,673, filed on Jun. 24, 2022, now Pat. No. 11,943,703, which is a
(Continued)

(51) Int. Cl.
*H04W 4/00* (2018.01)
*H04L 41/0893* (2022.01)
(Continued)

(52) U.S. Cl.
CPC ......... *H04W 48/16* (2013.01); *H04L 41/0893* (2013.01); *H04L 2101/622* (2022.05); *H04W 84/12* (2013.01); *H04W 88/08* (2013.01)

(58) Field of Classification Search
CPC ................ H04W 48/16; H04L 41/0893
(Continued)

(56) References Cited

U.S. PATENT DOCUMENTS

| 8,249,922 B2 | 8/2012 | Guo et al. |
| 2016/0183313 A1 | 6/2016 | Vallabhu et al. |
| 2016/0219548 A1 | 7/2016 | Lindheimer et al. |

FOREIGN PATENT DOCUMENTS

| CN | 106102181 B | 11/2020 |
| JP | 2011019104 A | 1/2011 |

(Continued)

OTHER PUBLICATIONS

3GPP TSG-RAN WG2 #97, Tdoc R2-1702028, Athens, Greece, Agenda Item: 8.5.2, Source: Broadcom, Title: Response to Way forward on uplink routing for eLWA in R2-1701685, Document for: Discussion and decision, Feb. 13-17, 2017 (2 pages).
(Continued)

*Primary Examiner* — Temica M Beamer
(74) *Attorney, Agent, or Firm* — Botos Churchill IP Law LLP

(57) ABSTRACT

In some examples, a wireless device includes a communication interface to communicate with a wireless network, and at least one processor configured to, receive, from an access point (AP), information including a network address policy of the wireless network. The at least one processor is configured to further, in response to the information including the network address policy, use an address of the wireless device according to the network address policy.

20 Claims, 4 Drawing Sheets

Related U.S. Application Data continuation of application No. 16/990,367, filed on Aug. 11, 2020, now Pat. No. 11,375,440, which is a continuation of application No. 16/010,607, filed on Jun. 18, 2018, now Pat. No. 10,750,435.

(51) Int. Cl.
  *H04W 48/16* (2009.01)
  *H04L 101/622* (2022.01)
  *H04W 84/12* (2009.01)
  *H04W 88/08* (2009.01)

(58) Field of Classification Search
  USPC .......................................................... 370/338
  See application file for complete search history.

(56) References Cited

FOREIGN PATENT DOCUMENTS

WO 2015031184 A2 3/2015
WO 2015031184 A3 5/2015

OTHER PUBLICATIONS

Broadcom Corporation et al., S2-131887, Interaction between ANQP / GAS parameters and WLAN_NS, 3GPP TSG SA WG2 #97, published at 3GPP Server on May 21, 2023, 6 Pages.
European Patent Office, Communication pursuant to Article 94(3) EPC for Appl. No. 19727622.3 dated Mar. 28, 2022 (6 pages).
European Patent Office, International Search Report and Written Opinion for PCT/EP2019/063545 dated Aug. 27, 2019 ( 15 pages).
Hamilton, Mark, IEEE 802.11-18/2055r0, ARC Closing Report, Nov. 2018 (8 pages).
IEEE 802.11-14/1353R3, Wireless LANs, Proposal to extend the Element ID space, Nov. 2014 (6 pages).
IEEE Standard for Local and Metropolitan Area Networks: Overview and Architecture Amendment 2: Local Medium Access Control (MAC) Address Usage, IEEE SID 802c-2017 (26 pages).
Intellectual Property India, Examination Report under sections 12 & 13 of the Patents Act for Appl. No.202047050210 dated Sep. 30, 2022 (7 pages).
Japanese Patent Office, Office Action for Appl. No. 2020-568409 dated Mar. 2, 2023 (including Translation) (6 pages).
Lavrukhin Vladimir, "An overhead analysis of Access Network Query Protocol (ANQP) in hotspot 2.0 Wi-Fi networks," Nov. 5, 2013 (6 pages).
McCann, Stephen, IEEE 802.11-17/1704r11, P802.11aq Waiver request regarding IEEE RAC comments, Mar. 2018 (9 pages).
McCann, Stephen, IEEE 802.11-18/2022r0, Local Administrator Advertisements, Nov. 2018 (4 pages).
McCann, Stephen, IEEE 802.11-19/0134r0, Wireless LANs, Locally Administered LAN ANQP-element, Jan. 2019 (4 pages).
Office Action for Korean Patent Application No. 10-2020-7033180, Oct. 23, 2023, 10 Pages.
Office Action issued in corresponding Canadian Patent Application No. 3097946, mailed Oct. 6, 2023, 5 pages.
Reasons for Rejection for Japanese Patent Application No. 2020-568409, Jul. 4, 2023, 9 Pages.
Riegel, Max, IEEE 802 Enhanced Network Detection and Selection, omniran-13-0063-00-0000, Aug. 26, 2013 (12 pages).
The Extended European Search Report for European Patent Application No. 23189243.1, Dec. 7, 2023, 14 Pages.
The First Office Action for Chinese Patent Application No. 201980037832.1 dated Jun. 30, 2023, 12 Pages.
Wikipedia, Generic Advertisement Service last edited Mar. 2, 2015 (2 pages).
Yunsong Yang (Huawei Technologies), IEEE Draft, doc.: IEEE 802.11-17/1621r0, "TGaq Meeting Minutes Nov. 2017 Session," Nov. 2017 (11 pages).
"Interaction between ANQP / GAS parameters and WLAN_NS, Document for: Discussion and Approval", SA WG2, Temporary Document, 3GPP SA WG2 Meeting #97, Busan, South Korea, Source: Broadcom Corporation AT&T, Agenda Item: 6.7, Work Item/ Release: WLAN_NS /Rel-12, May 27-31, 2013 (6 pages).
"Telecommunications and Information Exchange Between Systems Local and Metropolitan Area Networks", IEEE Standards Association, IEEE Standard for Information Technology-Specific Requirements Part 11: Wireless LAN Medium Access Control (MAC) and Physical Layer (PHY) Specifications, IEEE SID 802.11 2016, 3534 pages.
"Wireless LAN Medium Access control (MAC) and Physical Layer (PHY) Specifications", IEEE, Standard for Information Technology—Telecommunications and Information Exchange Between Systems Local 9 and Metropolitan area networks—Specific Requirements; Part 11: 2012; 2,793 pages.
McCann, Stephen , "P802.11aq Waiver request regarding IEEE RAC comments", IEEE 802.11-17/1704r11 (Mar. 6, 2018), 34 Pages.

NETWORK ADDRESS POLICY INFORMATION RECEIVED IN A PRE-ASSOCIATED STATE

CROSS REFERENCE TO RELATED APPLICATIONS

This application is a continuation of U.S. patent application Ser. No. 17/808,673, filed Jun. 24, 2022, allowed, which is a continuation of U.S. patent application Ser. No. 16/990,367, filed Aug. 11, 2020, now U.S. Pat. No. 11,375,440 issued on Jun. 28, 2022, which is a continuation of U.S. patent application Ser. No. 16/010,607, filed Jun. 18, 2018, now U.S. Pat. No. 10,750,435 issued on Aug. 18, 2020, the disclosure of which is incorporated herein by reference.

BACKGROUND

Electronic devices can communicate over wired or wireless networks. Wireless networks can include a wireless local area network (WLAN), which includes wireless access points (APs) to which devices are able to wirelessly connect. Other types of wireless networks include cellular networks that comprise wireless access network nodes to which devices are able to wirelessly connect.

To communicate over a network, an electronic device uses a network address, such as a Medium Access Control (MAC) address. In some cases, collisions between MAC addresses (due to duplication) assigned to different electronic devices may occur.

BRIEF DESCRIPTION OF THE DRAWINGS

Some implementations of the present disclosure are described with respect to the following figures.

Figure 1:
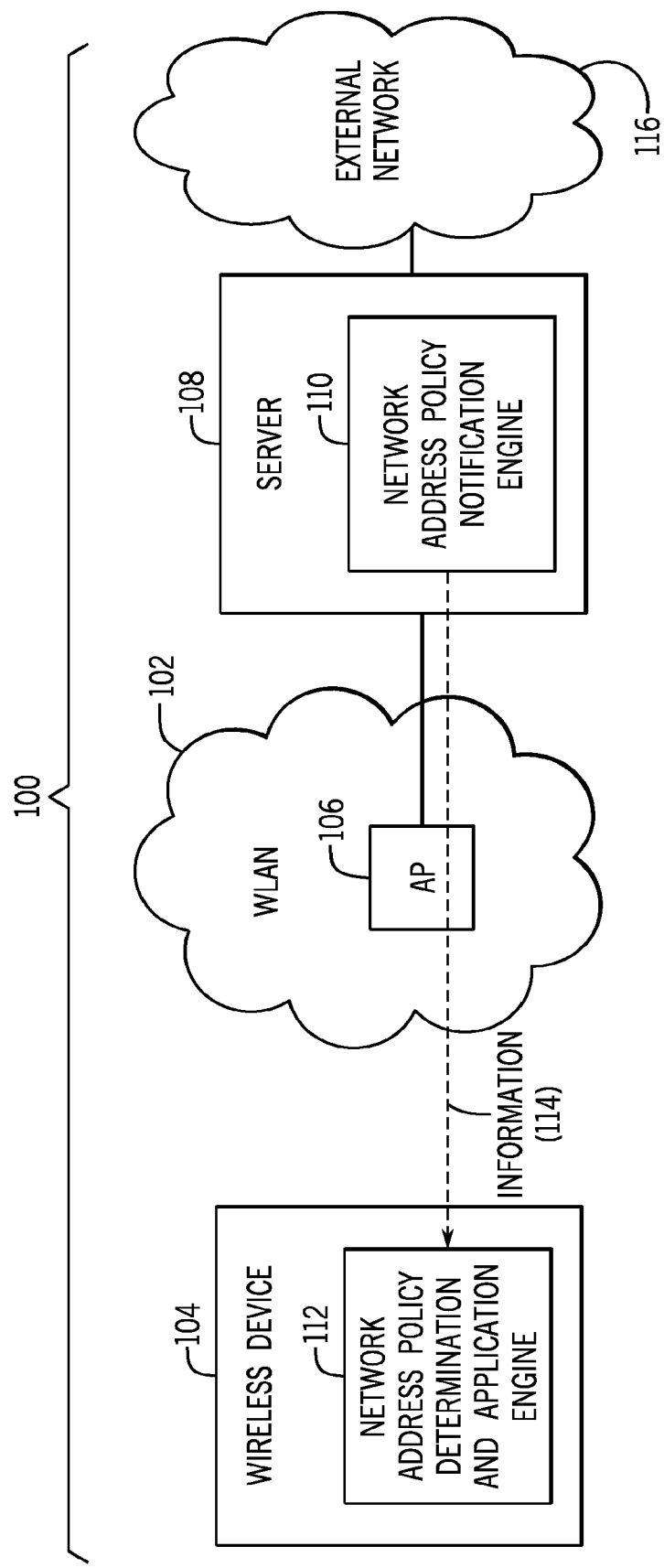
FIG. 1 is a block diagram of an example network arrangement in accordance with some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In a wireless local area network (WLAN), a wireless device may communicate with one or multiple wireless access points (APs). A wireless AP (or more simply, an AP) can refer to a communication device to which a wireless device can establish a wireless connection to communicate with other endpoint devices. WLANs can include wireless networks that operate according to the Institute of Electrical and Electronic Engineers (IEEE) 802.11 or Wi-Fi Alliance Specifications.

In other examples, wireless networks can operate according to other protocols. More generally, techniques or mechanisms according to some implementations of the present disclosure can be used with various types of wireless networks, such as WLANs, cellular networks, or other wireless networks. In a cellular network, an AP can refer to a wireless access network node, such as a base station or enhanced node B (eNodeB) in a cellular network that operates according to the Global System for Mobile communications (GSM), Universal Mobile Telecommunications Service (UNTS) or Long-Term Evolution (LTE) standards as provided by the Third Generation Partnership Project (3GPP). The LTE standards are also referred to as the Evolved Universal Terrestrial Radio Access (E-UTRA) standards. An AP can also refer to a fifth generation (5G) wireless access network node, or another type of wireless access network node.

Examples of wireless devices include computers (e.g., tablet computers, notebook computers, desktop computers, etc.), handheld devices (e.g. smart phones, personal digital assistants, etc.), wearable devices (smart watches, electronic eyeglasses, head-mounted devices, etc.), game appliances, health monitors, vehicles (or equipment in vehicles), cargo transportation units (e.g., trailers, containers, etc.), Internet of Things (IoT) devices, or other types of endpoint or user devices that are able to communicate wirelessly. Wireless devices can include mobile devices and/or fixed position devices. More generally, a wireless device can refer to an electronic device that is able to communicate wirelessly.

In the ensuing discussion, reference is made to communications and operations that are according to the IEEE 802.11 standards. It is noted that techniques or mechanisms according to some implementations of the present disclosure can be applied to communications and operations according to other standards.

According to the IEEE 802.11 standards, a wireless device can operate in one of several connection states:
State 1: initial start state, unauthenticated, un-associated.
State 2: authenticated, not associated.
State 3: authenticated and associated (pending Robust Security Network or RSN authentication).
State 4: authenticated and associated.

In accordance with some examples, reference is made to a pre-associated state of a wireless device. In the context of IEEE 802.11, the pre-associated state of a wireless device refers to State 1 noted above.

More generally, a pre-associated state of a wireless device refers to a state before the wireless device has established a connection (e.g., association in the terminology of the IEEE 802.11 standards) with a network, and before the wireless device has been authenticated. This state can also be referred to as prior to association.

When operating in the pre-associated state, a wireless device that operates according to IEEE 802.11 is unable to automatically configure its WLAN interface to adhere to a network policy of a selected network (WLAN). The WLAN interface has to be configured on the wireless device out-of-band (for example, by a non-WLAN communication exchange, such as over a cellular network, a Bluetooth link, etc.) by a network administrator that manages the WLAN.

The IEEE 802c-2017 Specification has introduced new requirements for usage of Medium Access Control (MAC) addresses in a local address space. A "local address space" refers to a range of MAC address values used by a particular wireless network that is distinct from another address range used by another wireless network. In some examples, MAC addresses can be defined as 48-bit values, and the 48-bit address range is divided into broadcast/multicast, globally unique, and locally administered. In other examples, MAC addresses can be values with a different number of bits.

The requirements of the IEEE 802c-2017 Specification are generally targeted towards wired networks, to allow network administrators to use the range of locally administered MAC addresses to support virtual network interfaces in data centers. IEEE 802c-2017 defines a Structured Local Address Plan (SLAP) that divides the local address space into four quadrants and assigns the range of MAC addresses in each quadrant to a specific purpose. If a wireless device using a random MAC address joins a WLAN and has traffic bridged to a same wired local area network (LAN) segment as the data center devices operating with MAC addresses assigned from the SLAP, there is a chance that the wireless device's MAC address may conflict with the addresses of other equipment operating on the wired network.

Reference to SLAP herein refers to the SLAP as defined original IEEE 802c-2017 Specification or any subsequent updates to SLAP requirements based on the original IEEE 802c-2017 Specification. Note that the IEEE 802c-2017 standard may subsequently be combined with another standard, such as the IEEE 802-2014, to become a new standard. The term "IEEE 802c-2017" includes any subsequent standard that includes at least a portion of the content of the IEEE 802c-2017 standard.

In some cases, a wireless device that operates according to IEEE 802.11 in a pre-associated state may be allowed by a network administrator of a WLAN to choose its own MAC Address. In this situation, the wireless device may choose a MAC address that is already in use in the WLAN. This can result in frames from the wireless device and another device with the duplicate MAC address being confused in the WLAN.

In accordance with some implementations of the present disclosure, a wireless device in a pre-associated state is able to receive, from a wireless network, information including a network address policy of the wireless network. The network address policy included in the received information can specify any of a number of different network address policies used in the wireless network. In some examples, the network address policy included in the received information can indicate use of an address (e.g., a network address such as a MAC address) with at least a portion of the address assigned according to the SLAP.

FIG. 1 is a block diagram of an example network arrangement 100 that includes a wireless local area network (WLAN) 102. The WLAN includes an AP 106 with which a wireless device 104 is able to wirelessly communicate. Although just one AP is shown in FIG. 1, it is noted that in some examples, the WLAN 102 may include multiple APs. Also, there may be multiple wireless devices to communicate with the one or more APs of the WLAN 102.

In some examples, the wireless device 104 is able to transmit and receive layer 2 frames (or more specifically, Medium Access Control (MAC) frames) over the air interface with the AP 106. Communications of layer 2 frames can occur while the wireless device 104 is in the pre-associated state (e.g., State 1 of IEEE 802.11), as well as in other states (e.g., including States 2, 3, and 4 of IEEE 802.11 noted above).

In accordance with some implementations of the present disclosure, the network arrangement 100 further includes a server 108, which includes a network address policy notification engine 110 that can provide an indication of a network address policy used by the WLAN 102 to the wireless device 104. The network address policy notification engine 110 can also act as a proxy or relay of policy from an external network 116.

As used here, an "engine" can refer to a hardware processing circuit, such as any or some combination of a microprocessor, a core of a multi-core microprocessor, a microcontroller, a programmable integrated circuit device, a programmable gate array, or any other hardware processing circuit. In other examples, an "engine" can refer to a combination of a hardware processing circuit and machine-readable instructions (software and/or firmware) executable on the hardware processing circuit.

The server 108 can be implemented as part of the AP 106, or alternatively, as a computing node or an arrangement of computing nodes separate from the AP 106.

The wireless device 104 includes a network address policy determination and application engine 112, which is able to receive information 114 including a network address policy of the WLAN 102 from the network address policy notification engine 110 of the server 108.

In some examples, the information 114 including the network address policy is in the form of a WLAN discovery message. Examples of WLAN discovery messages include any or some combination of the following: a beacon, a probe response, an Access Network Query Protocol (ANQP) message, or an IEEE 802.11 management frame (which can be a newly defined IEEE 802.11 management frame), and so forth.

A beacon is broadcast by the AP 106 for receipt by multiple wireless devices 104 within a wireless communication range of the AP 106. A broadcast beacon from the AP 106 can include a Service Set Identifier (SSID) of the AP 106. The SSID identifies the WLAN 102. The beacon can also include other information, which according to some implementations of the present disclosure includes the network address policy information 114.

A beacon is a type of an IEEE 802.11 management frame. In other examples, another type of an IEEE 802.11 management frame can be used to carry the network address policy information 114.

A probe response according to IEEE 802.11 is in response to a probe request sent by the wireless device 104. The probe request can be broadcast by the wireless device 104 for receipt by one or more APs within the range of the wireless device 104. The probe request is used by the wireless device 104 to discover AP(s) within the wireless communication range of the wireless device 104.

In further examples, the information 114 can be provided by the server 108 that implements an advertisement protocol. For example, the server 108 can use a Generic Advertisement Service (GAS) as a transport mechanism for an advertisement protocol. The advertisement protocol allows the bidirectional transmission of frames between the wireless device 104 and the server 108 prior to network connectivity, so that the wireless device 104 is effectively in a pre-associated state. This means that a device is connected to the layer 2 radio service, but has not exchanged any authentication parameters and does not have a recognized session (e.g. no session keys are established and no IP address is assigned). One example of an advertisement protocol is ANQP. ANQP operates as a simple query and response protocol that is used by a device to discover a range of information from an "Access Network Information" (ANI) server. This ANI server is either co-located with an AP or is located within a LAN, which is the layer 2 network to which the AP is connected. ANQP allows a device to determine the properties of the LAN before starting an association procedure.

Information obtained through ANQP can include: network identifiers, roaming relationships, supported security methods (IEEE 802.1X or web-based authentication), emergency services capability, available service providers, etc. This enables ANQP to be a useful protocol enabling discovery of information about WLANs, prior to the device establishing network connectivity.

In examples implementing ANQP, the server 108 can be an ANQP server that is used to convey ANQP information. The ANQP server is an advertisement server in the network that can receive ANQP requests and respond with ANQP responses. This server can also be referred to as an Access Network (AN) server.

Figure 2:
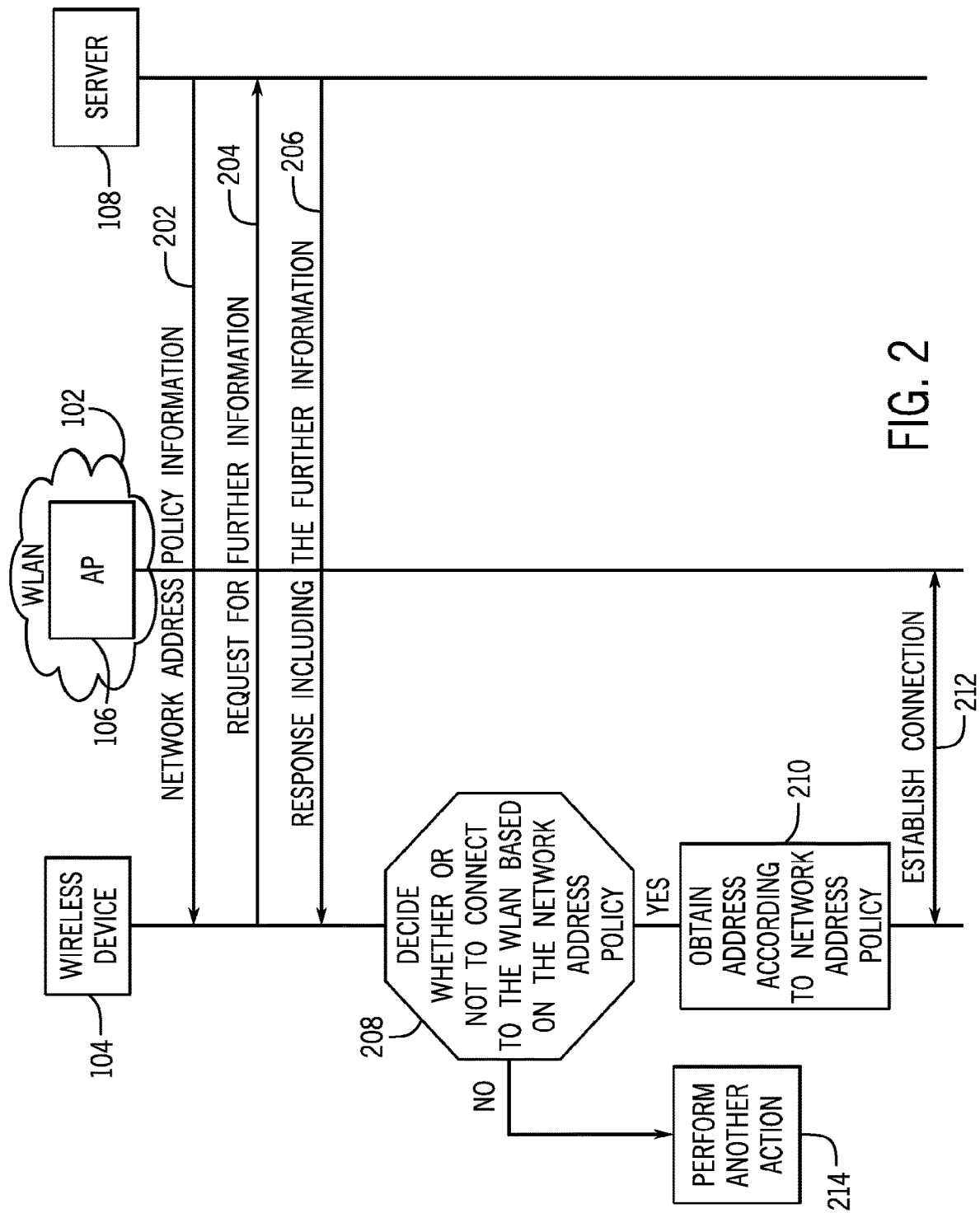
FIG. 2 is a flow diagram of a process according to some examples.

FIG. 2 is a message flow diagram of a process performed among the wireless device 104, the AP 106, and the server 108, according to further examples. The wireless device 104 receives (at 202) network address policy information, such as in a beacon or a probe response, for example.

In response, the wireless device 104 sends (at 204) a request for further information regarding the network address policy. For example, the network address policy information received (at 202) can include an indication that the WLAN 102 has a local network policy that the wireless device 104 is to conform to. However, the network address policy information received (at 202) may not include further detail regarding what the network address policy is. The request that is sent (at 204) can include an ANQP request or another request, for example. In some embodiments, the wireless device 104 does not need to receive network address policy information (at 202) before sending the request for further information (at 204).

In response to the request sent (at 204), the server 108 sends (at 206) a response that includes the requested further information regarding the network address policy. For example, the requested further information can include a value (selected from among multiple possible values) that indicates the specific network address policy to used. The multiple possible values indicate respective different network address policies. A further explanation of the different network address policies is provided later in this description.

Based on the further information regarding the network address policy, the wireless device 104 decides (at 208) whether or not to connect to the WLAN 102, as part of a network selection algorithm used by the wireless device 104.

If the wireless device 104 decides (at 208) to select the WLAN 102, the wireless device 104 obtains (at 210) an address of the wireless device according to the network address policy. Depending on the specific network address policy used, the address can be obtained in one of several different ways. The address can be obtained in any of the following ways: (1) locally generating the address in the wireless device 104, or (2) obtaining the address from the AP 106 or another network node, or (3) obtaining a portion of the address from the AP 106 or another network node, and (4) generating a second portion of the address in the wireless device 104.

The wireless devices 104 establishes (at 212) a network connection with the WLAN 102, and uses the obtained address to perform communications over the WLAN 102.

If the wireless device 104 decides (at 208) to not select the WLAN 102, then the wireless device 104 performs (at 214) another action, which can include selecting another WLAN for connection.

Specifying a local MAC address policy in an ANQP element

The following describes an example of using an ANQP-element to specify a local MAC address policy.

Figure 3:
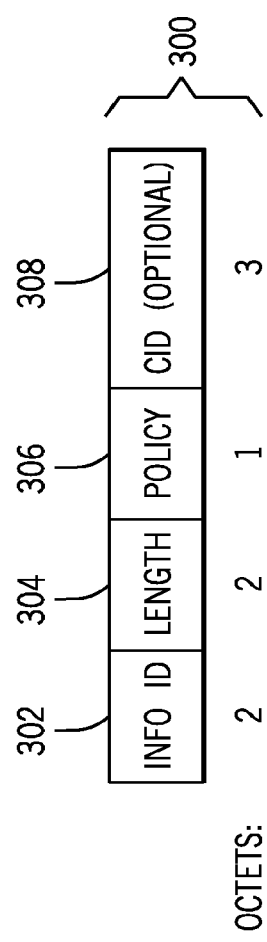
FIGS. 3 and 4 illustrate fields of network address policy elements, according to various examples.

FIG. 3 shows an example of a Local MAC Address Policy ANQP-element 300. The Local MAC Address Policy ANQP-element 300 includes the following example fields: Info ID field 302 (which is set to a value to identify the ANQP-element as a Local MAC Address Policy ANQP element), a Length field 304 (which is set to a value to indicate a length of a combination of a Policy field 306 and a Company Identifier (CID) field 308, if present), the Policy field 306 (which is settable to any of various different values to advertise specific policy information supported by the transmitting device, such as the AP 106), and the optional CID field 308 (discussed further below).

FIG. 3 shows the size (in terms of a number of octets) of each of the fields 302, 304, 306, and 308. In other examples, the fields of the ANQP-element 300 can have different sizes.

Table 1 below shows an example of possible values to which the Policy field 306 can be set.

TABLE 1

| Policy Field 306 value | Description of MAC Address policy |
|---|---|
| 0 | Allow a random MAC address within the full range of the local space. The random MAC address can be generated by a wireless device or by a network node in the WLAN. |
| 1 | Use only a globally assigned MAC address of the WLAN interface for the wireless device. |
| 2 | Use a MAC address within the SLAP Administratively Assigned Identifier (AAI) Space. The complete MAC address includes the 2 bits of the AAI Structured Local Address Plan (SLAP) quadrant plus the local/global bit and the unicast/multicast bit and then the rest of the bits of the MAC address are random. |
| 3 | Use a MAC address within the SLAP Extended Local Identifier (ELI) space. The complete MAC address includes the 2 bits of the ELI SLAP quadrant plus the local/global bit and the unicast/multicast bit and then the rest of the bits of the MAC address include a specific CID with the remaining bits being a random number. |
| 4 | Use a MAC address within the SLAP Standard Assigned Identifier (SAI) space. The complete MAC address includes the 2 bits of the SAI SLAP quadrant plus the local/global bit and the unicast/multicast bit and then the rest of the bits of the MAC address include a number generated by a protocol specified within various IEEE 802 standards. |

TABLE 1-continued

| Policy Field 306 value | Description of MAC Address policy |
|---|---|
| 5 | Use a MAC address within the SLAP quadrant "10" space. The complete MAC address includes the 2 bits of the "10" SLAP quadrant plus the local/global bit and the unicast/multicast bit and then the rest of the bits of the MAC address include a number generated by an administrator. |
| 6 | The local administrator will configure the MAC address. |
| 7-255 | Reserved |

If the Policy field 306 is set to value 0, then the MAC address of the wireless device 104 can be randomly assigned, either by the wireless device 104 itself or by the WLAN 102.

If the Policy field 306 is set to value 1, then the MAC address of the IEEE 802.11 interface of the wireless device 104 is set to a globally assigned MAC address.

If the Policy field 306 is set to value 2, 3, 4, or 5, then a portion of the MAC address of the wireless device 104 is assigned according to the IEEE 802c-2017 standard, while another portion(s) of the MAC address is (are) assigned in a different manner, such as randomly assigned (Policy field 306 set to value 2 or 3), assigned according to another standard (Policy field 306 set to value 4), or assigned by a network administrator (Policy field 306 set to value 5).

Table 2 below shows an example where the Policy field 306 can have a number of bits (eight bits 0-7 in the example shown). Each bit can be set between a logical low value ("0") and a logical high value ("1") to indicate whether or not the corresponding policy applies (as indicated by the second column of Table 2). In other words, each bit of the Policy field 206 is set to "1" when the indicated MAC Address policy is supported and "0" when it is not. Simultaneous policies supported by the transmitting STA can therefore be advertised.

TABLE 2

| Policy Field bits | Description of MAC Address policy |
|---|---|
| 0 | Allow a random MAC address within the full range of the local space. The random MAC address can be generated by a wireless device or by a network node in the WLAN. |
| 1 | Use only a globally assigned MAC address of the WLAN interface for the wireless device. |
| 2 | Use a MAC address within the SLAP Administratively Assigned Identifier (AAI) Space. The complete MAC address includes the 2 bits of the AAI Structured Local Address Plan (SLAP) quadrant plus the local/global bit and the unicast/multicast bit and then the rest of the bits of the MAC address are random. |
| 3 | Use a MAC address within SLAP Extended Local Identifier (ELI) space. The complete MAC address includes the 2 bits of the ELI SLAP quadrant plus the local/global bit and the unicast/multicast bit and then the rest of the bits of the MAC address include a specific CID with the remaining bits being a random number. |

TABLE 2-continued

| Policy Field bits | Description of MAC Address policy |
|---|---|
| 4 | Use a MAC address within the SLAP Standard Assigned Identifier (SAI) space. The complete MAC address includes the 2 bits of the SAI SLAP quadrant plus the local/global bit and the unicast/multicast bit and then the rest of the bits of the MAC address include a number generated by a protocol specified within various IEEE 802 standards. |
| 5 | Use a MAC address within SLAP quadrant "10" space. The complete MAC address includes the 2 bits of the "10" SLAP quadrant plus the local/global bit and the unicast/multicast bit and then the rest of the bits of the MAC address include a number generated by an administrator. |
| 6 | The local administrator will configure the MAC address. |
| 7 | Reserved |

The CID field 308 can be provided by the transmitting station (STA) to assist the receiving STA in a case where the Policy field 306 is set to the value 3 (Table 1 implementation) or bit 3 of the Policy field 308 is set to "1" (Table 2 implementation). If the CID field is not used for this option, then the CID may already be known to the receiving STA. For example, the receiving STA can be provisioned with the CID out of band or the receiving STA can also read the CID from the AP's Basic Service Set (BSS) Identifier (BSSID).

The advertised values of the Policy field 206 may change if the MAC address policy in both the transmitting and receiving STAs is dynamic. For example, the MAC address policy may only be used when the transmitting STA (or WLAN) is heavy loaded with traffic and devices.

With the Table 1 implementation, the Policy field 106 is set to value 1 to indicate that the MAC address policy is turned off—i.e., a global MAC address is used. Similarly, with the Table 2 implementation, bit 1 of the Policy field 106 is set to "1" to indicate that the MAC address policy is turned off.

Alternatively, the receiving STA can ignore any advertisements and use a global MAC address instead of an address indicated by any of the MAC address policies (for backwards compatibility). The choice to ignore or follow the advertised policy may be based on a user setting or based on data stored in the network profile for that particular wireless network.

Local MAC Address Policy in Another Message

In other examples, the local MAC address policy can be specified using a different element, such as within a beacon or a probe response.

Figure 4:
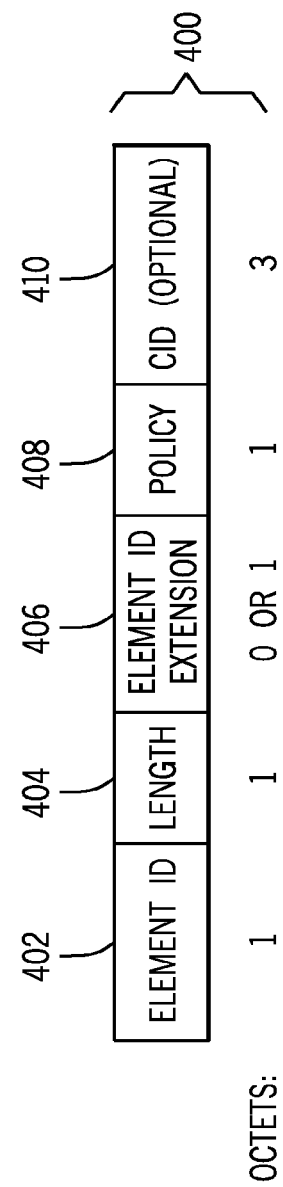

FIG. 4 shows an example of an MAC Address Policy element 400 that can be included in a beacon or a probe response. The MAC Address Policy element 400 includes the following example fields: an Element ID field 402 and an Element ID Extension field 406 (which when combined provides a value to identify the element as a MAC Address Policy element), a Length field 404 (to indicate a length of a combination of an Element ID Extension field 406, a Policy field 408, and a CID field 410, if present). The Policy field 408 can be set to any of various different values to indicate corresponding different local MAC address policies (such as according to Tables 1 and 2 above).

MAC Address Duplication Detection

In further examples, MAC address duplication can be detected. MAC address duplication detection includes detecting that multiple wireless devices have been assigned or are using the same MAC address.

Figure 5:
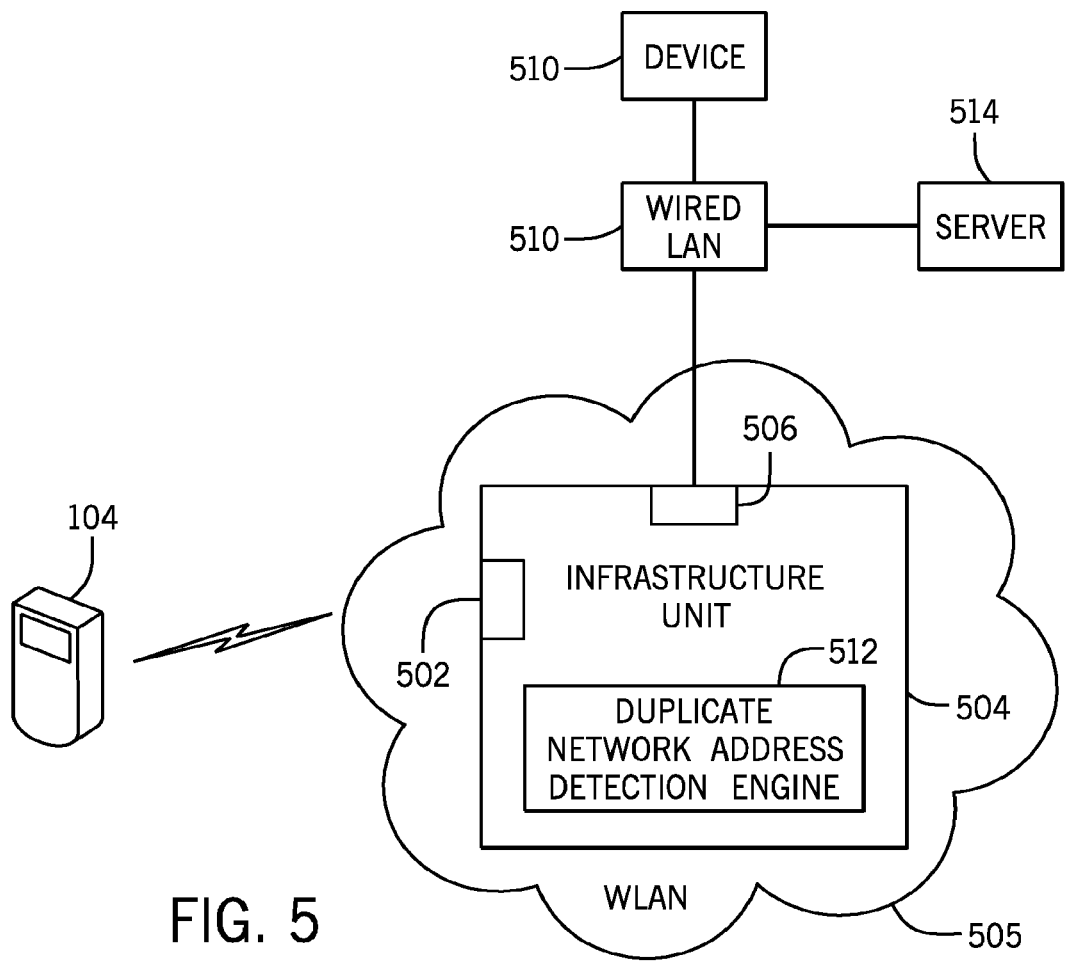
FIG. 5 is a block diagram of an arrangement including an infrastructure unit, a wired local area network, and a server, according to further examples.

FIG. 5 shows an example arrangement for MAC address duplication detection. The wireless device 104 is wirelessly connected to a wireless port 502 of an infrastructure unit 504, which can include an AP and/or a switch, that is part of a WLAN 505. A "wireless port" can refer to the circuitry and machine-readable instructions (e.g., physical layer and other layers above the physical layer of a protocol stack) that enable communication over a wireless link.

The infrastructure unit 504 further includes a wired port 506 that is connected to a wired local area network (LAN) 508. A "wired port" can refer to the circuitry and machine-readable instructions (e.g., physical layer and other layers above the physical layer of a protocol stack) that enable communication over a wired link.

A device 510 connected to the wired LAN 508 can be assigned a MAC address, and the wireless device 104 can also be assigned a MAC address. The infrastructure unit 504 includes a duplicate network address detection engine 512 that is able to monitor MAC addresses of associated devices, including the devices 104 and 510. The duplicate network address detection engine 512 monitors and maps the MAC addresses associated with the ports (including 502 and 506) of the infrastructure unit 504. Each port provides a logical interface to the infrastructure unit 504. At the switching level, the infrastructure unit 504 checks both wireless and wired ports to ensure that there is no duplication of MAC addresses assigned to wireless and wired devices.

If the duplicate network address detection engine 512 detects network address duplication (for example, the wireless port 502 and the wired port 506 on the infrastructure unit 504 have the same MAC address assigned to respective different devices), then the infrastructure unit 504 can de-authenticate either the wireless device 104 or the wired device 510 with an error indication (e.g., "duplicate MAC address detected"). The error indication indicates that the address of the de-authenticated device is a duplicate of another address already used in another device within the WLAN 505, the wired LAN 508 or an external network to which the WLAN 505 and/or wired LAN 508 are connected.

Additionally, the infrastructure unit 504 can provide an instruction to the de-authenticated device to assist the de-authenticated device to circumvent MAC address duplication in the future. The error indication and the instruction can be sent as an update to an existing error message or in a new error message from the infrastructure unit 504 to the de-authenticated device. If two wireless devices are detected as having duplicate MAC addresses (e.g., due to almost simultaneous MAC address assignment), either the most recent device detected is sent the error indication, or both wireless devices are sent the error indication.

In other examples, the duplicate network address detection engine 512 can be provided in a server 514 that is separate from the infrastructure unit 504. For example, the server 514 can include an Authentication, Authorization, and Accounting (AAA) server. An identity (e.g., MAC address) of the wireless device 104 can be passed in a message, such as a Remote Authentication Dial-In User Service (RADIUS) message, to the AAA server 514 for authentication. If the AAA server 514 detects that the MAC address assigned to the wireless device 104 is a duplicate of a MAC address assigned to another device (e.g., 510), the AAA server 514 can instruct the infrastructure unit 504 to transmit an error indication as noted above.

System Arrangement

Figure 6:
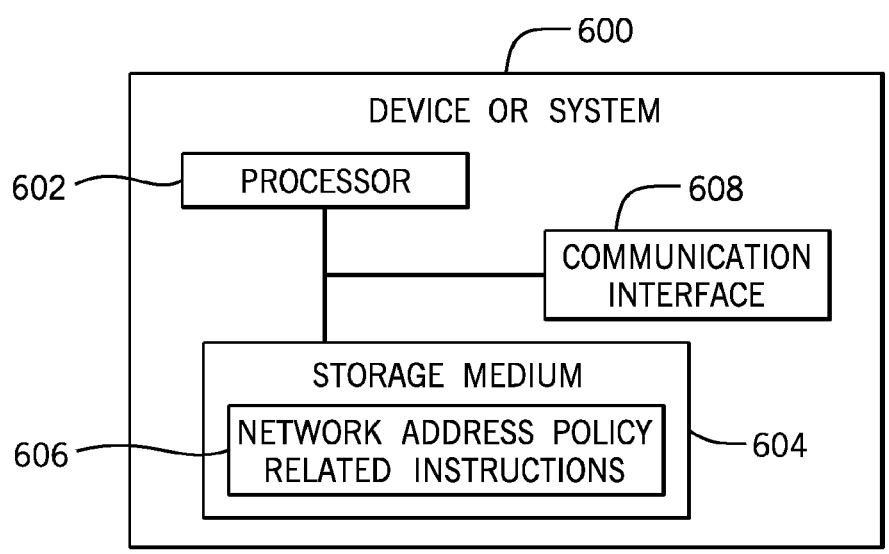
FIG. 6 is a block diagram of an electronic device or system, according to some examples.

FIG. 6 is a block diagram of a device or system 600, which can be a wireless device, a computer, or an arrangement of multiple computers. The computer or arrangement of computers can implement an AP, a server, or another network node.

The device or system 600 includes a processor 602 (or multiple processors). A processor can include a microprocessor, a core of a multi-core microprocessor, a microcontroller, a programmable integrated circuit, a programmable gate array, or another hardware processing circuit.

The processor(s) 602 can be coupled to a non-transitory machine-readable or computer-readable storage medium 604, which stores network address policy related instructions 606 executable on the processor 602 to perform various tasks discussed above, including wireless devices, APs, servers, network nodes, and so forth. Machine-readable instructions executable on a processor can refer to the instructions executable on a single processor or the instructions executable on multiple processors.

The device or system 600 further includes a communication interface 608 that includes a transceiver (e.g., a radio frequency (RF) transceiver to transmit and receive RF signals) and layers of a protocol stack. The communication interface 608 can communicate over a wired or wireless medium.

The storage medium 604 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A wireless device comprising:
a storage medium; and
one or more processors coupled to the storage medium, the one or more processors configured to:
receive an Access Network Query Protocol (ANQP) message from an access point (AP), wherein the ANQP message comprises information of a wireless network including a network address policy of the wireless network, and the network address policy governs setting of a Medium Access Control (MAC) address for the wireless device; and in response to the information including the network address policy, use an address of the wireless device according to the network address policy.

2. The wireless device of claim 1, wherein the information including the network address policy is settable to one of a plurality of values to indicate one of a plurality of different network address policies.

3. The wireless device claim 2, wherein the plurality of values comprise a first value indicating use of the address of the wireless device with at least a portion of the address assigned according to a Structured Local Address Plan (SLAP).

4. The wireless device of claim 3, wherein the first value indicates that a second portion of the address of the wireless device is one of randomly assigned, assigned according to another standard, or assigned by a network administrator.

5. The wireless device of claim 3, wherein the plurality of values further comprise a second value indicating use of a random address of the wireless device.

6. The wireless device of claim 3, wherein the plurality of values further comprise a second value indicating use of a global address of the wireless device.

7. The wireless device of claim 1, wherein the information including the network address policy is contained in a wireless local area network (WLAN) discovery message.

8. The wireless device of claim 1, wherein the ANQP message is received when the wireless device is in a pre-associated state.

9. The wireless device of claim 1, wherein the one or more processors are further configured to receive a beacon containing information including a network address policy.

10. The wireless device of claim 1, wherein the one or more processors are further configured to receive a probe response containing information including a network address policy.

11. The wireless device of claim 1, wherein the one or more processors are further configured to:
in response to the information including the network address policy, send a request to the AP; and
receive, from the AP in response to the request, further information about the network address policy,
wherein the address of the wireless device according to the network address policy that is used is based on the further information.

12. The wireless device of claim 1, wherein the one or more processors are further configured to:
receive, from a network node, an indication that the address of the wireless device is a duplicate of another address already used in the wireless device or the wireless network.

13. An access point (AP), comprising:
one or more processors configured to send, to a wireless device, an Access Network Query Protocol (ANQP) message comprising information including a network address policy of a wireless network, to cause the wireless device to use an address of the wireless device according to the network address policy, wherein the network address policy governs setting of a Medium Access Control (MAC) address for the wireless device.

14. The AP of claim 13, wherein the information including the network address policy is settable to one of a plurality of values to indicate one of a plurality of different network address policies.

15. The AP of claim 14, wherein the plurality of values comprise a first value indicating use of the address of the wireless device with a first portion of the address of the wireless device assigned according to an Institute of Electrical and Electronics Engineers (IEEE) 802c-2017 standard, and a second portion of the address of the wireless device randomly assigned.

16. The AP of claim 14, wherein the plurality of values comprise a first value indicating use of the address of the wireless device with a first portion of the address assigned according to an Institute of Electrical and Electronics Engineers (IEEE) 802c-2017 standard, and a second portion of the address of the wireless device assigned by another standard.

17. The AP of claim 14, wherein the plurality of values comprise a first value indicating use of the address with a first portion of the address of the wireless device assigned according to an Institute of Electrical and Electronics Engineers (IEEE) 802c-2017 standard, and a second portion of the address of the wireless device assigned by a network administrator.

18. The AP of claim 14, wherein the plurality of values comprise a first value indicating use of the address of the wireless device with at least a portion of the address assigned according to a Structured Local Address Plan (SLAP).

19. The AP of claim 18, wherein the first value indicates that a second portion of the address of the wireless device is one of randomly assigned, assigned according to another standard, or assigned by a network administrator.

20. The AP of claim 13, further comprising:
responsive to a determination that the address of the wireless device is duplicative of an address used by another wireless device, sending, to the wireless device or the another wireless device, a duplicated address indication.

* * * * *